United States Patent [19]
Adams

[11] 3,779,506
[45] Dec. 18, 1973

[54] APPARATUS FOR EQUALIZING THE FLOW RATE OF MOLDING COMPOUND INTO EACH OF A SERIES OF MOLD CAVITIES

[75] Inventor: Victor J. Adams, Tempe, Ariz.

[73] Assignee: Motorola, Inc., Franklin Park, Ill.

[22] Filed: Aug. 25, 1971

[21] Appl. No.: 174,815

[52] U.S. Cl......... 249/110, 425/250, 425/DIG. 812, 249/141, 249/95
[51] Int. Cl............................................. B29c 1/00
[58] Field of Search................ 249/110, 141, 95; 425/250, 247, 242, DIG. 812

[56] References Cited
UNITED STATES PATENTS

| | | | |
|---|---|---|---|
| 2,570,433 | 10/1951 | Dodge | 425/251 |
| 2,976,568 | 3/1931 | Foti | 425/DIG. 812 X |
| 2,672,653 | 3/1954 | Simpkins et al. | 425/250 X |
| 2,578,492 | 12/1951 | Simpkins et al. | 249/110 X |
| 3,650,648 | 3/1972 | Lambrecht | 425/242 X |

*Primary Examiner*—Robert D. Baldwin
*Assistant Examiner*—David S. Safran
*Attorney*—Mueller, Aichele & Gillman

[57] ABSTRACT

In a mold wherein there are a series of cavities to be filled from a single runner from which passageways, each including a gate, extend to each cavity, the velocity of molding or encapsulating compound into the cavities adjacent the end of the runner may be made the same as adjacent the beginning of the runner, by providing a dump cavity and a gate at the end of the runner to receive molding compound while the cavities adjacent the end of the runner are being filled.

2 Claims, 6 Drawing Figures

PATENTED DEC 18 1973 3,779,506

INVENTOR
Victor J. Adams
BY
Mueller & Aichele
ATTY'S

APPARATUS FOR EQUALIZING THE FLOW RATE OF MOLDING COMPOUND INTO EACH OF A SERIES OF MOLD CAVITIES

BACKGROUND OF THE INVENTION

This invention relates to injection molding, or transfer molding, apparatus and method wherein a plurality of mold cavities are filled at each operation, more particularly it relates to such molding apparatus and method wherein each of the mold cavities is filled qt substantially the same velocity of molding compound, and it is an object of the invention to provide improved apparatus and/or methods of this character.

In injection or transfer molding apparatus, particularly for encapsulating semiconductive chips and terminals, wherein very fine wires extend from parts of the chip to the terminals, the chips are bonded to a portion of a lead frame which also includes the terminals. Each chip, the terminals and fine bonding wires are of course, disposed in a separate cavity of the mold. A lead frame may hold many chips, for example, twelve in one single row or 24 in a double row with a runner extending therebetween. In the same example, four such double leads frames are held in a complete mold at one time, whereby 96 mold cavities are filled with molding compound in each operation.

In such molding operation, heated molding compound under the pressure of a ram is forced from a central sprue hole into the four mold runners each one of which extends between a double row of mold cavities, a passageway including a gate extending from each mold cavity to its associated runner.

It was found that the chips, terminals and fine wire leads (i.e., semiconductive devices) in the mold cavities adjacent the beginning of the runner, that is, adjacent the sprue hole filled properly and encapsulated the semiconductive device without distorting the wire leads or breaking them off even though the velocity of the molding compound into the cavity was high. However, it was found that the fine wires attached to parts of the chip and the terminals in the mold cavities near the end of the runner remote from the sprue hole frequently were distorted or bowed out of their original configuration. The change in shape of these wire leads was an indication of stress placed on the wires and in some cases resulted, subsequently, in wire, or wire bond, failures. Increased velocity of the molding compound into the remote end cavities was found to be the cause of the lead wire bowing. Accordingly, it is a further object of the invention to provide improved means adjacent the remote end of the mold runner for maintaining the velocity of the molding, or encapsulating compound, into the remote cavities to be the same, essentially, as that of the near cavities.

It is a further object of the invention to provide improved means for receiving molding compound flowing in a runner at its remote end while molding compound is flowing from the runner into the remote mold cavities.

It is a further object of the invention to provide an improved dump cavity at the remote end of the runner for receiving the flow of mold compound while the remote mold cavities are being filled at a normal flow rate.

It is a further object of the invention to provide a dump cavity of the nature indicated which includes a gate through which molding compound in the runner flows.

SUMMARY OF THE INVENTION

In carrying out the invention in one form, an injection mold is provided comprising a row of mold cavities, a supply opening for molding material, a runner extending from said supply opening, extending alongside said row of mold cavities and having an end remote from said supply opening, a passageway including a gate extending from each one of said mold cavities to said runner, a dump cavity at said end of said runner, and a gate in said runner ahead of said dump cavity.

In carrying out the invention in another form, an injection mold is provided comprising a row of mold cavities, a supply opening for molding material, a runner having a certain cross-sectional area and having a beginning end adjacent said supply opening, extending alongside said row of mold cavities, and having an end remote from said supply opening, a passageway reduced in cross-sectional area relative to the cross-sectional area of said runner extending from each one of said mold cavities to said runner for filling the associated cavity with molding compound and determining the velocity of such compound into such cavity, and means associated with said end of said runner for controlling the velocity of molding compound flowing through said passageways into the mold cavities adjacent the said remote end of said runner to be essentially equal to the velocity of molding compound through said passageways of mold cavities adjacent the beginning end of said runner.

DESCRIPTION OF THE PREFERRED EMBODIMENT

Figure 1:
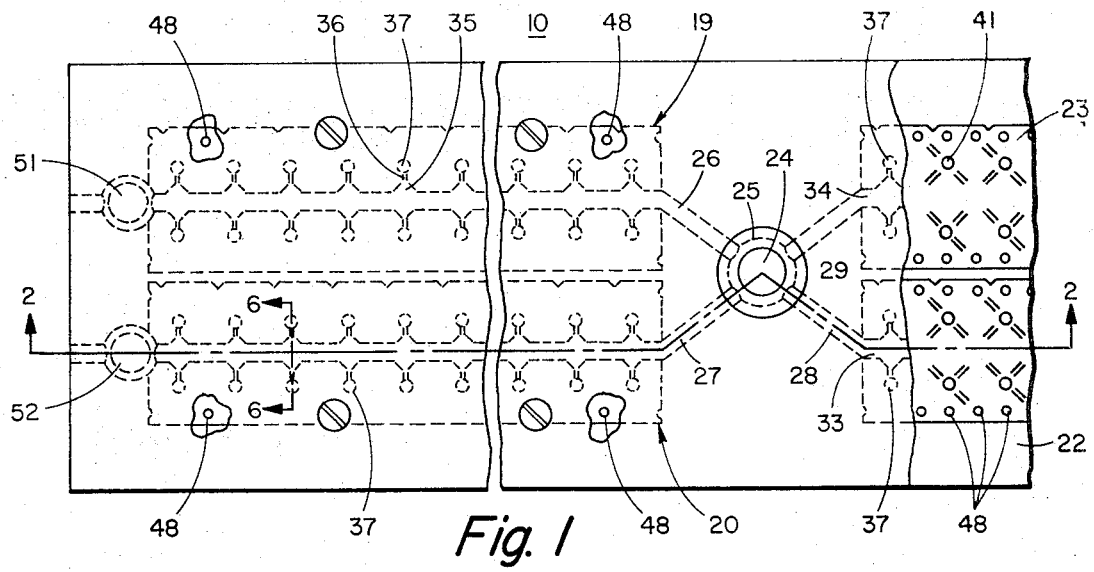
FIG. 1 is a plan view of a mold embodying the invention.

Referring to the drawing, the invention is shown embodied in a mold 10 comprising a top part 11 and a bottom part 12. The upper part 11 consists of two metallic plates or members 15 and 14 held together, for example, by screws 15. Similarly, the bottom part 12 consists of two metallic plates or members 16 and 17 held together as by screws 18. It will be understood the plates 13, 14, 16 and 17 may be made of appropriate material as hardened steel, for example. Other forms of molds may, of course, be used.

As shown, the mold is adapted to operate upon four lead frames 19, 21, 22 and 23, the lead frames 22 and 23 shown in part in FIG. 1, wherein the mold parts 13 and 14 are shown broken away, are shown in solid lines whereas the lead frames 19 and 21, in FIG. 1, are shown in dotted lines.

Figure 2:
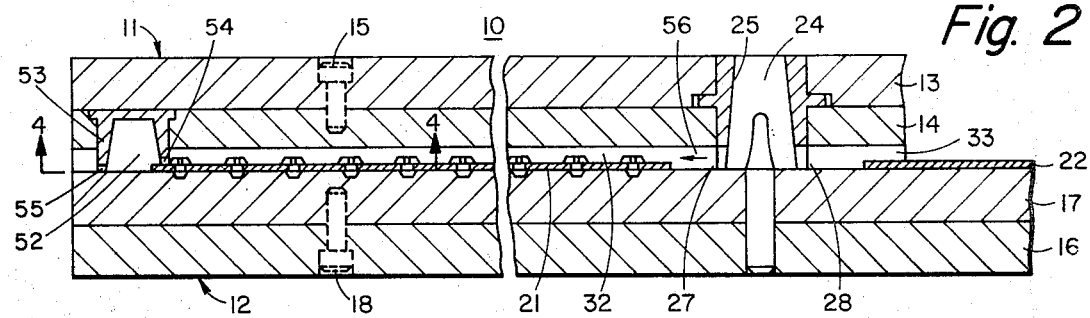
FIG. 2 is a sectional view taken substantially in the direction of the arrows 2—2 of FIG. 1.

When the mold is closed as shown in FIG. 2, the mold parts 14 and 17 tightly abut each other and the lead frames disposed therebetween as is well understood. Molding or encapsulating compound is forced under pressure through a sprue hole, or supply opening, 24 formed by a sprue hole liner 25 appropriately held within the mold plates 13 and 14. Fanning out from the sprue hole 24 are four runner extensions 26, 27, 28 and 29 which lead respectively into runners 31, 32, 33 and 34. The runner extensions 26–29 and the respectively connected runners 31–34 are formed in the upper plate member 14 of the mold.

Figure 6:
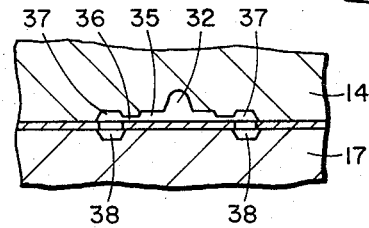
FIG. 6 is a sectional view on a larger scale taken substantially in the direction of the arrows 6—6 of FIG. 2.

Extending laterally from the runners 31, 32, 33 and 34 are a series of passageways 35 including a narrowed portion or gate 36 which leads into a slightly tapered cavity 37. While the reference characters 35, 36 and 37 are the only ones which have been shown applied to the mold cavity (FIG. 6) it will be understood that similar parts exist for each of the mold cavities shown in the drawing. In connection with the lead frame 19, there would be 12 cavities 37 shown on each side of the runner 31 (FIG. 1) for a total of 24 cavities in connection with lead frame 19. Similarly, there would be 24 cavities 37 for each of the lead frames 21, 22 and 23. Each of the cavities 37 will have a passageway 35 including a gate 36 associated therewith.

In the mold member 17 disposed immediately below the member 14, there are a series of cavities 38 disposed immediately opposite to the cavities 37. The cavities 37 and the cavities 38 together form the full or complete cavity which receives the molding or encapsulating compound for encapsulating a semiconductive device 39, for example, as shown in FIG. 5.

Figure 5:
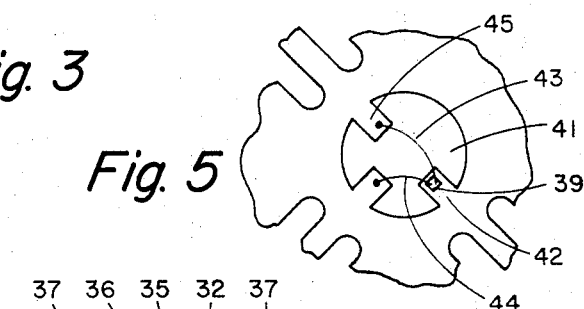
FIG. 5 is a view on a still larger scale illustrating a semiconductive device held within a mold for encapsulation in accordance with the invention.

Each of the lead frames 19, 21, 22 and 23 includes a series of openings 41 surrounded by the metal of the lead frame, shown best in FIG. 5. From the semiconductive chip 39 bonded, for example, on one terminal 42 of the lead frame, as shown in FIG. 5, the fine wire conductors 43 and 44 extend to the other terminals 45 and 46, respectively. The conductors may have a diameter on the order of 0.001 inch.

In the molding process, th lead frames 19–23 are placed upon the lower mold portion 17 and are held in the appropriate position by locating pins 48 which cooperate with holes 48 disposed alongside the edges of th lead frames. Once disposed in a desired location the openings 41 of the lead frames are disposed between the cavities 37 and 38 in the upper and lower mold portions. Thereafter molding or encapsulating compound at an elevated temperature and under high pressure is forced in through the sprue hole 24. The molding compound impinges upon the end of a pin 49 projecting upwardly into the sprue hole 24 and the molding compound divides and flows through the runner extensions 26–29 and into the runners 31–34. The molding compound under the force of the ram continues to flow down the runners 31–34, and in the process the molding or encapsulating compound flows through each of the passageways 35 and gates 36 into cavities 37 encapsulating the semiconductive devices 39 disposed therein. The molding compound flows at a substantial velocity through the runners and in a typical case moves at a velocity such that the transfer operation of the molding compound from the sprue hole 24 and into the mold cavities is completed in about 6 to 7 seconds.

Figure 3:
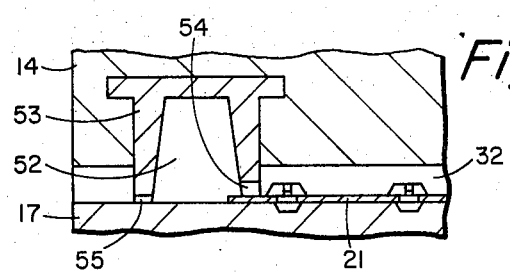
FIG. 3 is a sectional view on a larger scale of a portion of FIG. 2.

At the ends of the runners 31, 32, 33 and 34 remote from the sprue hole 24 there are respectively dump cavities 51 and 52, only two being shown because the mold has been shown broken at its right hand end. The mold dump cavities are identical to each other and only the dump cavity 52 shown in FIG. 3 will be described specifically. The dump cavity 52, while shown as comprising an insert 53 disposed in the upper mold portion 14, may be formed in any other manner desired so long as the intended purpose is achieved. The entrance to the dump cavity 52 is through a gate 54 formed in the insert 53, the gate 54 communicating with the runner 32 as may be seen best in FIG. 3. At the left-hand side of the insert 53 there is a small opening 55 which serves as a vent for air escape when the molding operation is going on.

During the molding operation as the molding or encapsulating compound moves along the runner 32 and the cavities 37, 38 adjacent the runner end near the dump cavity 52 are being filled with encapsulating compound, the dump cavity 52 is also being filled with molding compound which passes through the gate 54. It will, of course, be understood that the insert 53 is dimensioned so as to bear upon the lead frame 21 in order to form a seal with the lead frame 21 and the mold part 17. The dump cavity 52 has a volume of sufficient size and the gate 54 is appropriately dimensioned relative to the dimensions of the runner 32 and the gates 36 to the mold cavities 37, 38 in order that the mold cavities 37, 38 adjacent the dump cavity 52 ar filled at the same velocity of molding compound as the velocity of the molding compound moving into the cavities 37, 38 adjacent the runner extensions 26, 27, 28 and 29.

Figure 4:
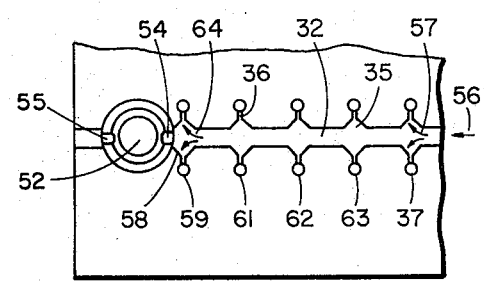
FIG. 4 is a view taken substantially in the direction of arrows 4—4 of FIG. 2.

As has been alluded to previously in this specification, it has been found that when the velocity of the molding compound, as it flows into the cavities 37, 38 and fills the opening 41 which includes the fine wires 43 and 44, the wires are deformed or bent out of position and perhaps might be broken if the velocity of the compound is too high. When the molding compound is moving down the runner 32 as shown by the arrow 56 in FIG. 2 and FIG. 4, there is room for the encapsulating compound to flow in the runner 32 while at the same time the compound is flowing through the passageways 35 and the gates 36 into the mold cavities 37 and 38 adjacent the runner extensions 27–29. The arrows 57 in FIG. 4 are representative of the velocity of the molding compound into cavities 37 and 38 before the molding compound reaches the dump cavity 52.

It may be visualized that, as the molding, or encapsulating, compound moves down the runner 32, a portion of the compound oozes, so to speak, through the passageways 35 and the gates 36 into the molding cavities. If there were no relief provided for the moving column of molding compound in passageway 32 when it reached the end 58 of the runner 32, the velocity of the molding compound flowing through the passageways 35 and gate 36 into the mold cavities 59, 61, 62 and 63, for example, and the mold cavities immediately opposite thereto would be very much increased. This occurs because the driving ram maintains its same speed. During the initial stages of the molding operation, the flow of molding compound into the cavities 37, 38 adjacent the runner extension 27, in a typical case, was about five and one half to seven and one half times the speed of the ram travel which forced the molding compound into the sprue hole 24. If the runner 32 should terminate at, for example, the cavity at the point 58, it has been found that the velocity of the molding compound into the cavities 59, 61, 62 and 63 increased to about 15 to 20 times the velocity of the ram. This is compared with the five and one half to seven and one half times which apply to the cavities adjacent the runner extension 27.

The provision of the dump cavity 52 and the gate 54 enables the molding compound moving in runner 32 to flow into a space without creating back pressure, thereby permitting the molding compound to flow slowly, leak, or ooze, so to speak through the passageways 35 and gates 36 leading into the mold cavities 59, 61, 62 and 63. In this manner all of the semiconductive devices which are encapsulated in the mold are the same and do not have their fine wire leads 43 and 44 distorted out of position.

In one actual case, the dimensions of the runner 32 were 0.125 inches wide at its base and 0.100 inches deep at its highest point which had a radius of 0.064 inches. The gates 36 had dimensions of 0.010 inches high and 0.030 inches wide. The gate 54 was 0.080 inches in diameter and was essentially semi-circular in cross-section. The dump cavity (truncated cone shape) 52 had a diameter equal to 0.355 inches at its largest dimension and a diameter of 0.300 inches at its smaller diameter with a taper of 5°. The depth of the dump cavity was about 0.315 inches. The mold cavity which includes the combined cavities 37 and 38 had a diameter of 0.086 inches at its largest, a depth of 0.06 inches and a 7° taper of the sides.

Utilizing the dump cavity 52 of the invention and the included gate 54, accordingly, enables the devices encapsulated in the cavities 59, 61, 62, 63 and any others approaching the end of the runners, e.g., 32, to have the same qualities of encapsulation without distortion of the position of the wires 43 and 44 as cavities closer to the beginning of the runners, e.g., 32, and similarly, of course, for the other runners 31, 33 and 34. The arrows 64 adjacent the cavity 59 in FIG. 4 are representative of the fact that the velocity of the molding compound into the cavity 59 is the same as that into cavities earlier in the position along the runner 32.

The runner 32 continues to the end of the mold in order to enable the air escaping through the small passage 55 to escape completely without creating any back pressure against the molding compound moving into the cavity 59.

Accordingly, inasmuch as all of the devices encapsulated in the mold are of high quality, as for example, out of each side row of 12 cavities, four additional good units are obtained. This increases the percentage yield by a very substantial factor and corresponding economies are therefore achieved in the manufacture of devices.

The improvement in method is the maintenance of substantially uniform velocity of flow of encapsulating compound into all mold cavities irrespective of the distance from the source, or sprue hole.

I claim:

1. An injection mold wherein a series of mold cavities are filled from a runner in response to back pressure of flowing molding material developed in said runner comprising:

a row of mold cavities, a supply opening for molding material, a runner for receiving said molding material in fluid form, said runner having a certain cross-sectional area, having a beginning end adjacent said supply opening, extending alongside said row of mold cavities, and having an end remote from said supply opening, a passageway reduced in cross-sectional area relative to the cross-sectional area of said runner extending from each one of said mold cavities to said runner for filling the associated cavity with fluid molding compound and determining the velocity of such compound into such cavity, and means associated with said remote end of said runner for receiving fluid molding material from said runner to control the velocity of molding compound flowing through the passageway into at least the one of said mold cavities immediately preceding said end to be essentially equal to the velocity of molding compound through said passageways of said mold cavities adjacent the beginning end of said runner as determined by the flow of fluid molding material in said runner, said means comprising a passageway reduced in cross-sectional area relative to the cross-sectional area of said runner and a dump cavity terminating said passageway.

2. An injection mold wherein a series of mold cavities are filled from a runner in response to back pressure of flowing molding material developed in said runner comprising:

a row of mold cavities, a supply opening for molding material, a runner for receiving said molding material in fluid form, said runner having a certain cross-sectional area, having a beginning end adjacent said supply opening, extending alongside said row of mold cavities, and having an end remote from said supply opening, a passageway reduced in cross-sectional area relative to the cross-sectional area of said runner extending from each one of said mold cavities to said runner for filling the associated cavity with fluid molding compound and determining the velocity of such compound into such cavity, and means associated with said end of said runner for receiving fluid molding material from said runner to control the velocity of molding compound flowing through said passageways into the mold cavities adjacent the said remote end of said runner to be essentially equal to the velocity of molding compound through said passageways of mold cavities adjacent the beginning end of said runner as determined by the flow of fluid molding material in said runner, said means comprising a restricted passageway, a gate and a dump cavity terminating said runner.

* * * * *